(12) United States Patent
Mizuno et al.

(10) Patent No.: US 8,124,048 B2
(45) Date of Patent: Feb. 28, 2012

(54) PROCESS FOR PRODUCING HIGH-PURITY α-ALUMINA

(75) Inventors: Jun Mizuno, Shizuoka (JP); Toshihiro Matsuba, Tokyo (JP); Shigeo Yamamoto, Shizuoka (JP); Takashi Yamada, Shizuoka (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 163 days.

(21) Appl. No.: 12/518,169

(22) PCT Filed: Dec. 4, 2007

(86) PCT No.: PCT/JP2007/073366
§ 371 (c)(1),
(2), (4) Date: Jun. 23, 2009

(87) PCT Pub. No.: WO2008/072501
PCT Pub. Date: Jun. 19, 2008

(65) Prior Publication Data
US 2010/0021374 A1   Jan. 28, 2010

(30) Foreign Application Priority Data
Dec. 15, 2006   (JP) .................................. 2006-339032

(51) Int. Cl.
*C01F 7/02* (2006.01)
(52) U.S. Cl. ........................................ 423/630; 423/625
(58) Field of Classification Search ........... 423/625–630
See application file for complete search history.

(56) References Cited

U.S. PATENT DOCUMENTS

| | | | |
|---|---|---|---|
| 2,405,275 | A | 8/1946 | Stowe et al. |
| 4,177,235 | A | 12/1979 | Neidhardt et al. |
| 6,162,413 | A | 12/2000 | Fujiwara et al. |

FOREIGN PATENT DOCUMENTS

| | | |
|---|---|---|
| CN | 1085820 C | 5/2002 |
| JP | 47-5744 B | 2/1972 |
| JP | 48-34680 B | 10/1973 |
| JP | 54-16398 A | 2/1979 |
| JP | 55-07532 A | 1/1980 |
| JP | 55-140719 A | 11/1980 |
| JP | 62-46922 A | 2/1987 |
| JP | 1-298018 A | 12/1989 |
| JP | 6-37293 B2 | 2/1994 |
| JP | 7-206434 A | 8/1995 |
| JP | 8-290914 A | 11/1996 |
| JP | 10-324519 A | 12/1998 |

OTHER PUBLICATIONS

Chinese Office Action issued on Dec. 6, 2010 in corresponding Chinese Patent Application No. 200780046473.3.

*Primary Examiner* — Edward Johnson
(74) *Attorney, Agent, or Firm* — Birch, Stewart, Kolasch & Birch, LLP

(57) ABSTRACT

Provided is a process for producing a high-purity α-alumina in which an Si content, an Fe content, a Ca content, and an Na content are simultaneously removed. The high-purity α-alumina is produced by burning aluminum hydroxide having an Na content of 0.11 mass % or less, an Fe content of 6 ppm or less, a Ca content of 1.5 ppm or less, and an Si content of 10 ppm or less as impurities in terms of alumina respectively, and having an average particle diameter of 55 μm or less at a burning temperature of 1,100 to 1,500° C. by using a burning vessel containing $Al_2O_3$ in a range of 85 to 93 wt % and $SiO_2$ in a range of 7 to 14 wt % and subjecting the obtained α-alumina to wash treatment.

7 Claims, 5 Drawing Sheets

PROCESS FOR PRODUCING HIGH-PURITY α-ALUMINA

TECHNICAL FIELD

The present invention relates to a process for producing a high-purity α-alumina, and more specifically, to a process for producing a high-purity α-alumina in which Si, Fe, Ca, and Na contents are removed as much as possible.

BACKGROUND ART

α-alumina ($\alpha\text{-}Al_2O_3$) is widely used in a refractory, an abrasive material, an insulator, an electronic part, a sparkling plug, a filler, a catalyst carrier, and the like because of its excellent insulating property, heat resistance, abrasion resistance, corrosion resistance, and the like. Of those, a high-purity α-alumina is used in applications of fine ceramics, electronic parts, and the like. Conventionally, as a conventional method of producing a high-purity α-alumina, there have been used an aluminum alkoxide hydrolysis method, a tetraammonium aluminate method, an alum thermal decomposition method, an ammonium aluminum carbonate thermal decomposition method, an aluminum chloride thermal decomposition method, an underwater spark discharge method, and the like. The production processes of those methods are complicate and the raw materials to be used are expensive, resulting in extremely high cost of an α-alumina to be obtained.

Then, there are proposed some methods of producing a high-purity α-alumina by using a Bayer method which is generally employed as a method of producing a generalized α-alumina. Examples thereof include: a method involving fusing, with an electric furnace, alumina obtained by the Bayer method, giving a hollow granular material by blowing compressed air or the like to the fused alumina, and impregnating the resultant with a mineral acid to elute impurities (see Patent Document 1); a method involving pulverizing a corundum obtained by electrothermal fusing of alumina with $SiO_2$ and washing the resultant with hydrochloric acid and hydrofluoric acid to give a high-purity α-alumina (see Patent Document 2); a method involving pulverizing aluminum hydroxide obtained by the Bayer method or a transition alumina obtained by sintering the aluminum hydroxide and burning the resultant under an atmosphere including hydrogen chloride gas at 600 to 1,400° C. (see Patent Document 3); and a method involving covering aluminum hydroxide by the Bayer method and an intermediate alumina obtained by heat treatment of the aluminum hydroxide as raw materials with a carbonaceous substance, burning the covered product at a temperature of 800° C. or higher under reduced-pressure atmosphere, and heating the resultant under normal pressure and an oxidizing atmosphere for decarburizing (see Patent Document 4). However, with those methods, an electromelting treatment is required (Patent Documents 1 and 2) and burning under a specific atmosphere is required (Patent Documents 3 and 4), and hence it is necessary to prepare facilities other than the kiln used in producing a generalized alumina by the Bayer method.

On the other hand, when the Bayer method is employed, there is a general problem that a large amount of an Na content remains in the obtained alumina because caustic soda (sodium hydroxide) is used in the process of the Bayer method. In the case where alumina is used as an insulating material or an electronic part material, it is necessary to remove the Na content as much as possible because the Na content is a factor of inhibiting electrical insulating characteristics. From the foregoing, there are proposed: a method involving burning aluminum hydroxide in two stages, i.e. at low temperature and high temperature, and repeating washing and filtrating (see Patent Document 5); a method involving adding hydrochloric acid or aluminum chloride to aluminum hydroxide and burning the mixture in a siliceous fireproof vessel (burning vessel) (see Patent Document 6); a method involving burning aluminum hydroxide or alumina in the coexistence of hydrochloric acid or aluminum chloride, and boric acid or boron oxide (see Patent Document 7); a method involving adding hydrochloric acid or aluminum chloride to aluminum hydroxide, mixing a silica-based substance therein, burning the mixture, and thereafter, separating the silica-based substance (see Patent Document 8); and a method involving burning aluminum hydroxide to give a crystal-free amorphous alumina, washing the amorphous alumina with an aliphatic lower carboxylic acid, and burning the resultant again (see Patent Document 9). However, even with those methods, about 100 to 600 ppm of Na content is contained in the finally obtained α-alumina in any cases and the α-alumina is not necessarily used satisfactorily for applications including electronic part materials. In addition, with those methods, the effect of reducing the amounts of metals as impurity such as Si, Ca, and Fe cannot be expected.

In view of the foregoing, there are proposed the following methods: a method involving pulverizing alumina powders with an iron medium having a diameter of 2 mm or less, washing the resultant aluminum powders with hydrochloric acid or nitric acid, and further washing the resultant with sulfuric acid having a concentration of 10 N or more to remove an Fe content in alumina (see Patent Document 10); a method of reducing an Si content by burning aluminum hydroxide or alumina with addition of fluoride thereto (see Patent Document 11); and the like. However, in the method of removing an Fe content, it is necessary to use an alumina powder having a purity of 99.99 mass % or more as a starting material. In addition, the content of the impurity supposed to be Fe was reduced to only 40 to 50 ppm in examples thereof. On the other hand, in the method of reducing an Si content, the fluoride to be used also functions as a particle growth-promoting agent of α-alumina, and hence, the α-alumina to be obtained tends to become coarse particles. Therefore, the method is unsuitable for a method of producing a high-purity α-alumina for an electronic material or ceramics raw material where fine particles are demanded.

Patent Document 1: JP 55-7532 A
Patent Document 2: JP 53-79797 A
Patent Document 3: JP 08-290914 A
Patent Document 4: JP 06-37293 B
Patent Document 5: U.S. Pat. No. 2,405,275
Patent Document 6: JP 47-5744 B
Patent Document 7: JP 48-34680 B
Patent Document 8: JP 54-16398 A
Patent Document 9: JP 55-140719 A
Patent Document 10: JP 10-324519 A
Patent Document 11: JP 62-46922 A

DISCLOSURE OF THE INVENTION

Problem to be Solved by the Invention

In the conventional methods described above, even if each single method is employed or some methods are combined, it is difficult to obtain a high-purity α-alumina in which all of an Si content, an Fe content, a Ca content, and an Na content are simultaneously reduced. From the foregoing, the inventors of the present invention have extensively studied on a process for producing a high-purity α-alumina in which those metals as impurity are removed as much as possible. As a result, the inventors have found that there can be obtained an α-alumina in which those metals as impurity are removed as much as possible as described above by burning, in a specific burning vessel, aluminum hydroxide which has an Na content and an Fe content each equal to or lower than a predetermined value and has a controlled average particle diameter, and then subjecting the resultant to wash treatment. Thus, the present invention has been completed.

Accordingly, an object of the present invention is to provide a process for producing a high-purity α-alumina, the process being capable of producing, easily and at low cost, a high-purity α-alumina in which all of an Si content, an Fe content, a Ca content, and an Na content are simultaneously removed.

In addition, another object of the present invention is to provide a high-purity α-alumina in which all of an Si content, an Fe content, a Ca content, and an Na content are simultaneously removed.

Means for Solving the Problems

That is, the present invention provides a process for producing a high-purity α-alumina, characterized by including: burning aluminum hydroxide having an Na content of 0.11 mass % or less, an Fe content of 6 ppm or less, a Ca content of 1.5 ppm or less, and an Si content of 10 ppm or less as impurities in terms of alumina respectively, and having an average particle diameter of 55 μm or less at a burning temperature of 1,100 to 1,500° C. by using a burning vessel containing $Al_2O_3$ in a range of 85 to 93 wt % and $SiO_2$ in a range of 7 to 14 wt %; and subjecting the obtained α-alumina to wash treatment.

In addition, the present invention provides a high-purity α-alumina, characterized by including an Si content of 20 ppm or less, an Fe content of 10 ppm or less, a Ca content of 2 ppm or less, and an Na content of 40 ppm or less.

In the process for producing a high-purity α-alumina (α-$Al_2O_3$) of the present invention, aluminum hydroxide to be used needs to have an average particle diameter of 55 μm or less and preferably 30 μm or less and have, as impurities, an Na content of 0.11 mass % or less in terms of alumina ($Na_2O$ content is 0.15 mass % or less in total), an Fe content of 6 ppm or less in terms of alumina, a Ca content of 1.5 ppm or less in terms of alumina, and an Si content of 10 ppm or less in terms of alumina. When the average particle diameter is larger than 55 μm, the removal efficiency of the Na content is low, such aluminum hydroxide is not suitable to reduce the Na content in alumina to 40 ppm or less. In addition, when the Na content exceeds 0.11 mass % in terms of alumina ($Na_2O$ content is 0.15 mass % in total), even if the Na content is removed by burning and wash treatment, all Na content cannot be removed and a large amount of the Na content remains. As a result, there arises a problem that the Na content in alumina exceeds 40 ppm. On the other hand, regarding impurities other than the Na content, original contents in aluminum hydroxide transfer into alumina and remain. Therefore, in view of contamination content in the production process, a high-purity α-alumina having an Fe content of 10 ppm or less, an Ca content of 2 ppm or less, and an Si content of 20 ppm or less can be obtained finally by setting respective Fe content, Ca content, and Si content to the above-mentioned ranges. Note that, regarding the impurity amounts contained in aluminum hydroxide, because one molecule of alumina trihydrate ($Al_2O_3 \cdot 3H_2O$: a molecular weight of 155.96) corresponds to one molecule of alumina ($Al_2O_3$: a molecular weight of 101.96), the amounts of the impurities in the aluminum hydroxide are converted into alumina base by multiplying 1.53 (155.96/101.96). Therefore, the amounts of the impurities before conversion to alumina are represented as follows: the Na content is 0.074 mass % or less ($Na_2O$ content is 0.1 mass % or less in total), the Fe content is 4 ppm or less, the Ca content is 1 ppm or less, and the Si content is 6 ppm or less.

Means for obtaining the aluminum hydroxide is not particularly limited. For example, the aluminum hydroxide may be one obtained by the Bayer method, and aluminum hydroxide obtained by a method described in JP 11-278829 A may be suitably used. That is, a supersaturated sodium aluminate solution having a dissolved-$Na_2O$ concentration (C) of 100 g/L or more and an Fe concentration in a liquid of 0.4 mg/L or less, and a molar ratio of a dissolved-$Na_2O$ content to a dissolved-$Al_2O_3$ content (M, dissolved-$Na_2O$ content/dissolved-$Al_2O_3$ content) of 1.6 to 2.0 is used as a raw material solution. Then, an aluminum hydroxide having a solution temperature (T, ° C.) satisfying the following formula (1) where the solution temperature is 75° C. or lower, $$T \leq 1.2 \times 10^6 / C^2 \tag{1}$$

and a BET specific surface area of 1 to 7 m²/g is added as a seed at a ratio of 2 to 15 m²/L to the raw material solution.

In this time, the amount of seed-derived, contaminated Fe, which is incorporated into the raw material solution from the added seed, is maintained to or under a permissive maximum value Y (mg/L) represented by the following equation (2)

$$Y = 2.0 \times 10^{-3} \times A \times (3.0 - M) \tag{2}$$

[provided that A in the formula represents a dissolved-$Al_2O_3$ concentration (g/L)]. Next, while a supersaturated concentration X of the raw material solution represented by the following equation (3)

$$X = A - C \times \exp\left\{6.2106 - \left(\frac{2486.7 - 1.0876C}{T + 273}\right)\right\} \tag{3}$$

is maintained to 30 g/L $\leq$ X $\leq$ 50 g/L, the solution temperature (T) is decreased to 55° C. or lower under stirring, followed by decomposing until the above molar ratio (M) becomes 3.0 or more. Then, the deposited aluminum hydroxide is subjected to solid-liquid separation, whereby an aluminum hydroxide having an average particle diameter of 15 to 40 μm, an $Na_2O$ content of 0.1 mass % or less in total, and an Fe content of 4 ppm or less can be obtained. The average particle diameter of the obtained aluminum hydroxide can be made smaller by a pulverizing treatment. Note that the above equation (3) is derived from so-called the White formula (Light Metals, (1984), pp 237-253).

As described above, the supersaturated sodium aluminate solution used as a raw material solution at the time of producing aluminum hydroxide may be prepared by any method and preferably prepared by the Bayer method. Specifically, a supersaturated sodium aluminate having a dissolved-$Na_2O$ concentration (C) of 100 to 200 g/L, a molar ratio (M) of a dissolved-$Na_2O$ content to a dissolved-$Al_2O_3$ content of 1.5 to 1.8, and an Fe concentration in a liquid of 1 to 15 mg/L is used, and an aluminum hydroxide having a BET specific surface area of 3 to 7 m²/g is added, as a seed, at a ratio of 15 to 50 m²/L to the solution. Then, the aluminum hydroxide is brought into contact with the supersaturated sodium aluminate at 70 to 80° C. under stirring for 1 to 3 hours, followed by solid-liquid separation. Thus, the supersaturated sodium aluminate may be preferably obtained as a purified, supersaturated sodium aluminate solution.

In addition, at the time of burning the aluminum hydroxide, a burning vessel containing $Al_2O_3$ in the range of 85 to 93 wt % and $SiO_2$ in the range of 7 to 14 wt % is used. A generally used burning vessel which is so-called siliceous-based burning vessel containing $SiO_2$ in a relatively large amount has problems that a large amount of the Si content remains in alumina after burning and the purity of the obtained alumina lowers due to vaporization or adsorption of Ca and Fe. On the other hand, a burning vessel containing $SiO_2$ in a relatively small amount and containing alumina at a high level has problems that Si contamination can be suppressed, but an Na reduction effect is small and Ca contamination becomes remarkable. In view of the foregoing, the inventors of the present invention repeatedly carried out burning tests by changing the combination of the composition of the burning vessel and the burning temperature. As a result, the inventors have newly found that, by burning the aluminum hydroxide at a predetermined temperature in a burning vessel having $Al_2O_3$ in the range of 85 to 93 wt % and $SiO_2$ in the range of 7 to 14 wt %, the contamination of metals as impurity such as Si, Ca, and Fe can be suppressed as well as a sufficient Na reduction effect can be obtained, whereby an α-alumina can be obtained.

In the case where aluminum hydroxide is burned under a state of being charged into the burning vessel, for the purpose of preventing contamination due to vaporization or adsorption of the impurities derived from the burning vessel, a contact area between the aluminum hydroxide to be charged (hereinafter, referred to as "charging aluminum hydroxide", and includes a mass, aggregation, premold, etc. of aluminum hydroxide) into the burning vessel and the burning vessel may be preferably reduced as much as possible. It is more preferred that the charging aluminum hydroxide is burned under such a state that the contact area of the surface of the charging aluminum hydroxide to the burning vessel is 30% or less thereof. A part which is in contact with the burning vessel in the obtained α-alumina especially contains a large amount of an Si content. However, impurity contamination through the contact part can be avoided as much as possible by setting the contact area within the above range. In addition, in a noncontact part where the charging aluminum hydroxide and the burning vessel are not in contact with each other, the charging aluminum hydroxide is burned while a space having a distance of preferably 5 mm or more is provided, whereby impurity contamination can be avoided as much as possible.

Means for reducing the contact area of the charging aluminum hydroxide with respect to the burning vessel is not particularly limited. For example, aluminum hydroxide (charging aluminum hydroxide), which has been preliminarily press-molded according to the shape of the burning vessel, may be charge into the burning vessel through a spacer formed of a sintered piece made of high-purity alumina so that a predetermined space is formed between the aluminum hydroxide and the inner surface of the burning vessel. In addition, aluminum hydroxide (charging aluminum hydroxide) is press-molded so as to have legs capable of supporting its own weight, the legs being in contact with the bottom part of the inner wall of the burning vessel. The thus press-molded aluminum hydroxide may be charge into the burning vessel so that only the legs are in contact with the burning vessel. Alternatively, a sheet material which is formed of polyethylene, polypropylene, polystyrene, or the like and is completely burned at the time of burning is arranged on the inner wall of the burning vessel and the aluminum hydroxide (charging aluminum hydroxide) may be put through the sheet material.

In this time, if the aluminum hydroxide becomes α-alumina by burning, the aluminum hydroxide can maintain the shape to a certain degree due to sintering Therefore, if a predetermined opening is provided in the sheet material arranged in the bottom part of the inner wall of the burning vessel, the aluminum hydroxide filled in the opening becomes a leg which supports its own weight even after the sheet material has been completely burned, and the contact between the part other than the leg and the burning vessel can be avoided. Note that a predetermined space is preferably provided between the lid of the burning vessel and the charging aluminum hydroxide. In addition, the part where impurities may contaminate due to the contact with the burning vessel is preferably removed after the burning. More specifically, the part having a thickness of 5 mm (depth of 5 mm) from the surface layer of the obtained α-alumina having a predetermined shape as a lump is more preferably removed after the burning.

Then, the aluminum hydroxide put in the burning vessel is burned at a burning temperature of 1,100 to 1,500° C. When the burning temperature is lower than 1,100° C., the removal effect of the Na content tends to be insufficient, and there is a problem that the Na content in the α-alumina to be obtained cannot be set to 40 ppm or less. On the contrary, when the burning temperature exceeds 1,500° C., impurity contamination from the burning vessel is remarkable, and the Fe content, Ca content, and Si content in the α-alumina cannot be maintained to 10 ppm or less, 2 ppm or less, and 20 ppm or less, respectively. The burning enables reduction of the Na content contained in the aluminum hydroxide, and an α-alumina having a final Na content of 40 ppm or less can be stably obtained. The reduction effect of the Na content in the burning is influenced largely by the particle diameter of the aluminum hydroxide and the burning conditions. That is, the smaller the diameter of the aluminum hydroxide is, the larger the reduction effect of the Na content is. Alternatively, the higher the burning temperature is, the larger the reduction effect is.

In order to reduce the Na content effectively, the burning is preferably performed until particles of α-alumina grow and become a crystal from the aluminum hydroxide. An appropriate burning time is preferably 1 hour or longer, though the burning time is not necessarily limited thereto, because the time depends on the Na content contained in the aluminum hydroxide, the particle diameter, and in addition, the temperature at the time of the burning. In addition, the aluminum hydroxide may be burned in the atmosphere of the air.

In addition, in the present invention, the α-alumina obtained by burning is subjected to wash treatment. The object of the wash treatment is to additionally remove the Na content contained in the α-alumina obtained by burning. From the foregoing, the α-alumina obtained by burning is preferably slurried with repulp water such as pure water, hydrochloric acid, phosphoric acid, or hydrofluoric acid, washed under stirring to dissolve the Na content in the α-alumina, and then subjected to flow washing by passing washing water.

The wash treatment conditions depend on, in addition to the Na content and the particle diameter of the aluminum hydroxide, the temperature at the time of the burning. The following conditions are exemplified. That is, in the stir washing, the α-alumina is suitably slurried with 2 L or more of a repulp water with respect to 1 kg of the α-alumina, and the slurry is stirred for 1 hour or longer when the α-alumina is slurried. If the amount of the repulp water is less than 2 L per kg of the alumina, the reduction effect of the Na content may not be expected sufficiently even if the slurry is stirred for 1 hour or longer. Even if the α-alumina is slurried with more than 2 L of repulp water per kg of the alumina and the slurry is stirred for 1 hour or longer, the effect of the stir washing is saturated. Next, while filtering, a residual liquid containing eluted Na content contained between particles may be substituted by passing a sufficient amount of washing water. More specifically, in the flow washing after the stir washing, 3 L or more, or preferably L or more of washing water per kg of α-alumina may be allowed to pass for flow washing. If the amount of flow washing is less than 3 L per 1 kg of alumina, the washing effect of the dissolved Na content may not be expected sufficiently. The effect is saturated if the amount of the flow washing exceeds 5 L or more per kg of alumina.

The α-alumina subjected to the wash treatment is dried by a general technique such as fix drying, fluidized-bed drying, or spray drying, whereby a high-purity α-alumina having an Si content of 20 ppm or less, an Fe content of 10 ppm or less, a Ca content of 2 ppm or less, and an Na content of 40 ppm or less can be obtained. In the present invention, as required, the obtained high-purity α-alumina is preferably further subjected to heat treatment at a temperature of 800 to 1,000° C. or more preferably 900 to 1,000° C. and then subjected to wash treatment again. Thus, the heat treatment and rewash treatment are repeated, whereby the Na content can be reduced to 10 ppm or less additionally without changing the physical properties of the high-purity α-alumina. Alternatively, the metals as impurity may be further removed by pulverizing the high-purity α-alumina, slurrying the α-alumina again, and bringing the slurried α-alumina into contact with, for example, an ion exchange resin having a strong ionicity.

Effects of the Invention

According to the present invention, a high-purity α-alumina in which metals as impurity, such as Si, Fe, Ca, and Na are removed as much as possible can be easily produced at low cost. Specifically, a high-purity α-alumina including an Si content of 20 ppm or less, an Fe content of 10 ppm or less, a Ca content of 2 ppm or less, and an Na content of 40 ppm or less can be obtained. In addition, according to the production process of the present invention, a high-purity α-alumina having almost the same particle diameter as that of aluminum hydroxide serving as a raw material can be obtained, and hence, the applications thereof are not limited. In addition, the high-purity α-alumina is expected to be used in a wide range including fine ceramics, electronic parts, pharmaceuticals, and the like in addition to the general applications of α-alumina such as insulators and abrasive materials. Thus, the high-purity α-alumina is extremely important in the industries.

DESCRIPTION OF SYMBOLS

1: burning vessel, 2: burning vessel body, 2a: side part of inner wall, 2b: bottom part of inner wall, 3: lid, 4: aluminum hydroxide mass, 4a: legs, 5: sheet material, 5a: openings

BEST MODE FOR CARRYING OUT THE INVENTION

Hereinafter, suitable embodiments of the present invention are described with reference to drawings.

Figure 1:
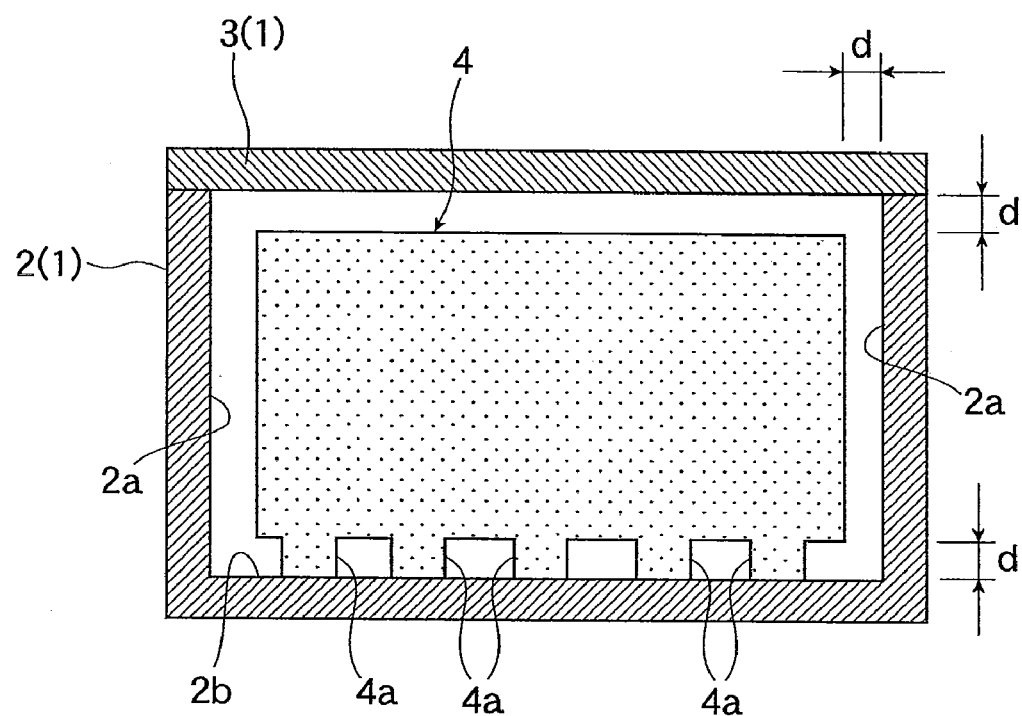
FIG. 1 is a sectional view illustrating burning of aluminum hydroxide using a burning vessel.
Figure 2:
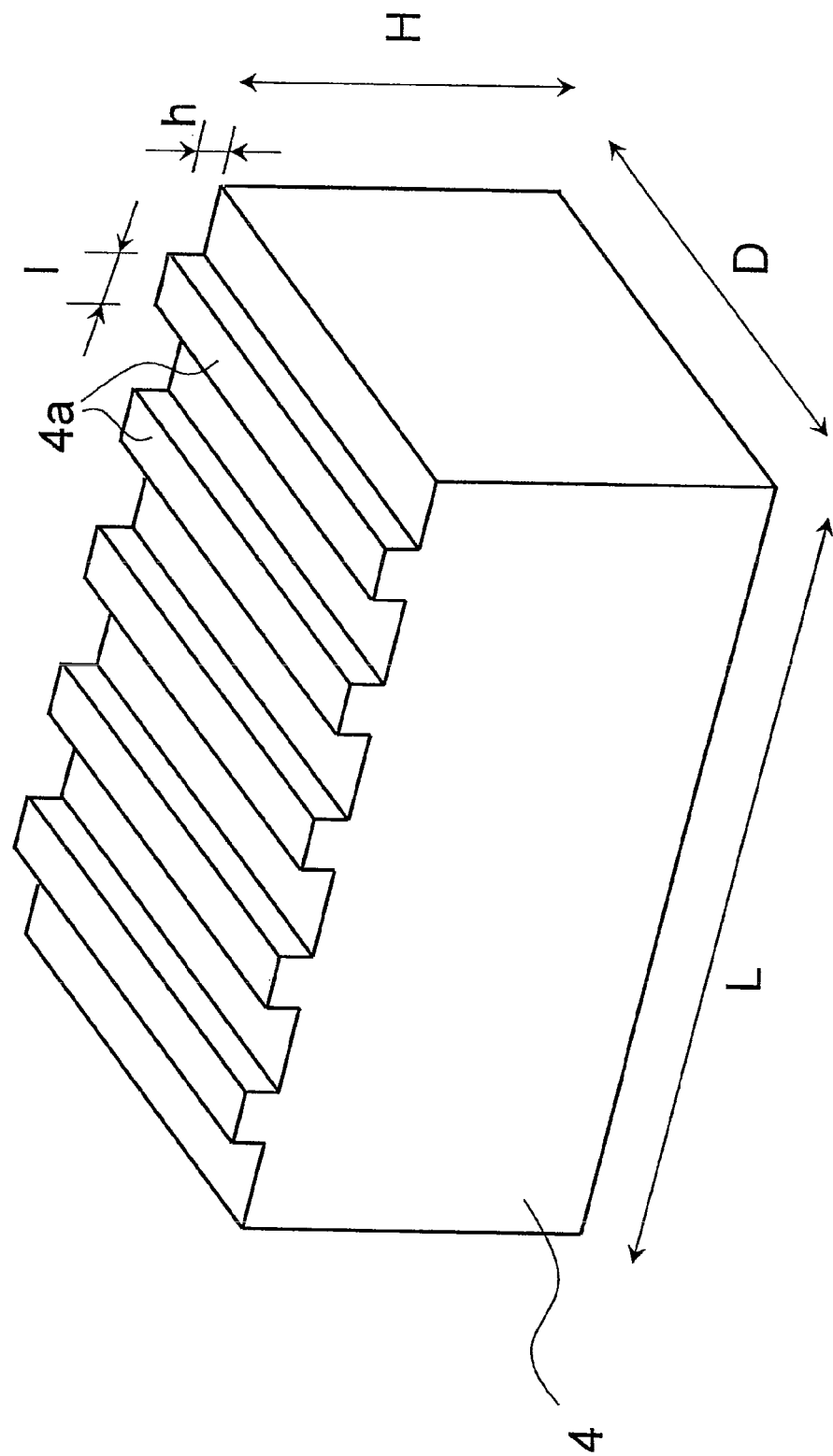
FIG. 2 is perspective view illustrating a charging aluminum hydroxide which is obtained by press-molding aluminum hydroxide.

FIG. 1 is a sectional view illustrating burning of aluminum hydroxide using a burning vessel 1. The burning vessel 1 is formed of a burning vessel body 2 containing $Al_2O_3$ in the range of 85 to 93 wt % and $SiO_2$ in the range of 7 to 14 wt %, and a lid 3 containing similarly $Al_2O_3$ in the range of 85 to 93 wt % and $SiO_2$ in the range of 7 to 14 wt %. A charging aluminum hydroxide 4 which has been press-molded previously is put in the burning vessel 1. As illustrated in FIG. 2, the charging aluminum hydroxide 4 is press-molded into a wooden clog form having legs 4a. Only the legs 4a are arranged with a given space d from an inner wall face so as to be in contact with the burning vessel 1.

Figure 3:
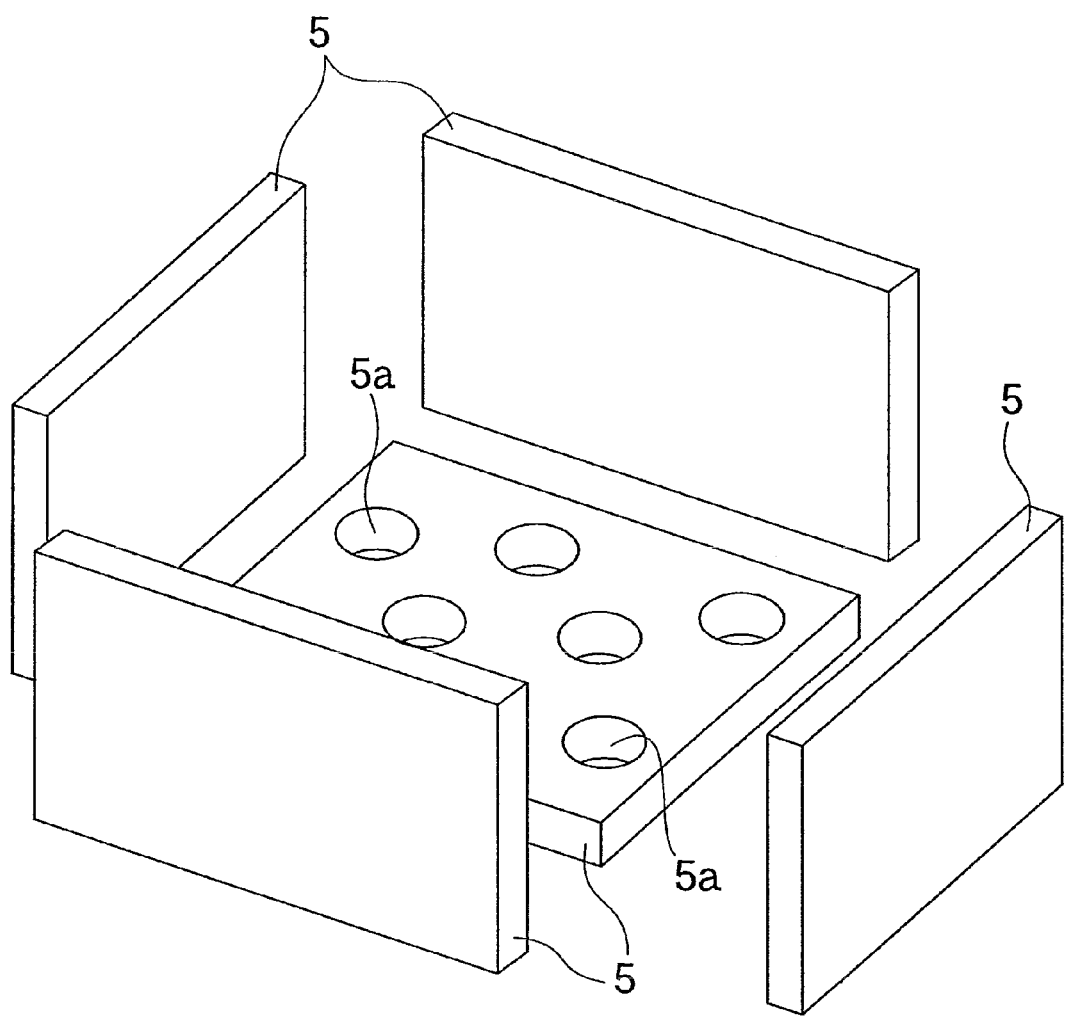
FIG. 3 is an explanatory drawing for assembly of a sheet material used in burning aluminum hydroxide.

In the case of burning aluminum hydroxide using the burning vessel 1, a sheet material 5 illustrated in FIG. 3 may also be used. The sheet material 5 is formed of polyethylene, polypropylene, polystyrene, or the like and is completely burned after the burning. The sheet material 5 is used as an inner sole in the case of charging aluminum hydroxide into the burning vessel 1. Sheet materials for a side part of an inner wall 2a of the burning vessel body 2 (four sheets in FIG. 3) and a sheet material for a bottom part of the inner wall 2b of the burning vessel body 2 (one sheet in FIG. 3) may be prepared separately according to the shape of the burning vessel 1. Of those, in the sheet material 5 for the bottom part of the inner wall 2b of the burning vessel body 2, some openings 5a are preferably provided so that the filled aluminum hydroxide forms legs capable of supporting its own weight after the burning.

As a method of using the sheet material 5, the above-mentioned sheet material 5 is arranged on the inner wall of the burning vessel body 2. In this time, the sheet material 5 provided with the openings 5a is arranged on the bottom part of the inner wall 2b. Then, aluminum hydroxide as a raw material is charged in the burning vessel body 2 where all the sheet materials 5 are arranged. In this case, the shape of the charging aluminum hydroxide is preferably arranged while pressing. After the all amount of the aluminum hydroxide is filled, the lid 3 is put on the burning vessel body 2.

The burning vessel 1 filled with aluminum hydroxide is burned in a shuttle kiln, an electric furnace, or the like at a burning temperature of 1,100 to 1,500° C. The burning time may be preferably 1 hour or longer, though the burning time is not necessarily limited thereto, because the time depends on the particle diameter of the aluminum hydroxide, the contained Na content, and the like. In this case, the aluminum hydroxide may be burned in an atmosphere of the air.

Then, α-alumina obtained by the burning generally has a shape of lump, and hence, is subjected to predetermined wash treatment after the shredder of the lump as required. A suitable method for the wash treatment is as follows: first, α-alumina cooled to room temperature is put in repulp water such as pure water, hydrochloric acid, phosphoric acid, or hydrofluoric acid to slurry the α-alumina; and the resultant is subjected to stir washing to elute metals as impurity (mainly Na content) remained in the α-alumina. In this case, 1 kg of the α-alumina may be preferably slurried with 2 L or more of repulp water and the stirring time may be preferably 1 hour or longer. After the stir washing, the slurry is injected in a filter, and the repulp water is sucked and separated by filtration to remove the eluted metals as impurity. Next, while washing water (for example, pure water) is allowed to pass through in the filtered α-alumina, repulp water containing the metals as impurity remained between particles was substituted with washing water, whereby the α-alumina is washed by suction and separation by filtration. In this case, 3 L or more or preferably 5 L or more of washing water with respect to 1 kg of the α-alumina is preferably allowed to pass to wash the α-alumina. After the wash treatment, for example, the resultant is dried by spray drying, whereby a high-purity α-alumina having an Si content of 20 ppm or less, an Fe content of 10 ppm or less, a Ca content of 2 ppm or less, and an Na content of 40 ppm or less can be obtained.

In the present invention, as required, the thus obtained high-purity α-alumina may be preferably subjected to heat treatment at a temperature of 800 to 1,000° C. and subjected to wash treatment again. Alternatively, the high-purity α-alumina is pulverized and slurried again, and the metals as impurity are further removed by bringing the slurried α-alumina into contact with an ion exchange resin having high ionicity, for example. Those treatments are carried out, whereby the Na content is further reduced to 10 ppm or less.

EXAMPLES

Tests with Different Burning Vessels (Test Nos. 1 to 21)

First, in order to investigate the relationship between the material of the burning vessel 1 (the burning vessel body 2 and the lid 3) and the amount of the metals as impurity contained in the α-alumina obtained by using the burning vessel 1, aluminum hydroxide is burned using each of burning vessels A to G having chemical compositions (mass %) shown in Table 1, and thereafter, a high-purity α-alumina was produced by carrying out wash treatment. The burning vessels A and B are so-called siliceous burning vessels and the burning vessels E, F, and G are burning vessels having alumina at high level. Note that the material of each burning vessel is obtained by an analytical result with a fluorescent X-ray analysis. In addition, Table 1 shows the dimension (inner diameter) of each burning vessel body.

TABLE 1

| Mark of vessel | Burning vessel material (fluorescent X-ray analysis) | | | | | | |
|---|---|---|---|---|---|---|---|
| | Chemical composition (%) | | | | | | |
| | $Al_2O_3$ | $Si_2O$ | CaO | $Fe_2O_3$ | $Na_2O$ | MgO | Dimension (mm) |
| A | 66.8 | 27.9 | 0.16 | 0.94 | 0.18 | 2.60 | 300 × 300 × 100H |
| B | 73.5 | 23 | 0.17 | 1.20 | 0.22 | 0.25 | 140Φ × 150H |
| C | 86.3 | 13.3 | 0.09 | 0.09 | 0.15 | 0.01 | 280 × 230 × 95H |
| D | 92.9 | 6.7 | 0.07 | 0.10 | 0.14 | — | 280 × 230 × 95H |
| E | 95.0 | 1.4 | 0.08 | 0.07 | 0.13 | — | 140Φ × 118H |
| F | 99.6 | 0.1 | 0.01 | — | 0.01 | 0.03 | 200 × 200 × 140H |
| G | 99.4 | 0.1 | 0.02 | 0.02 | 0.01 | 0.05 | 217Φ/140Φ × 100H |

Figure 4:
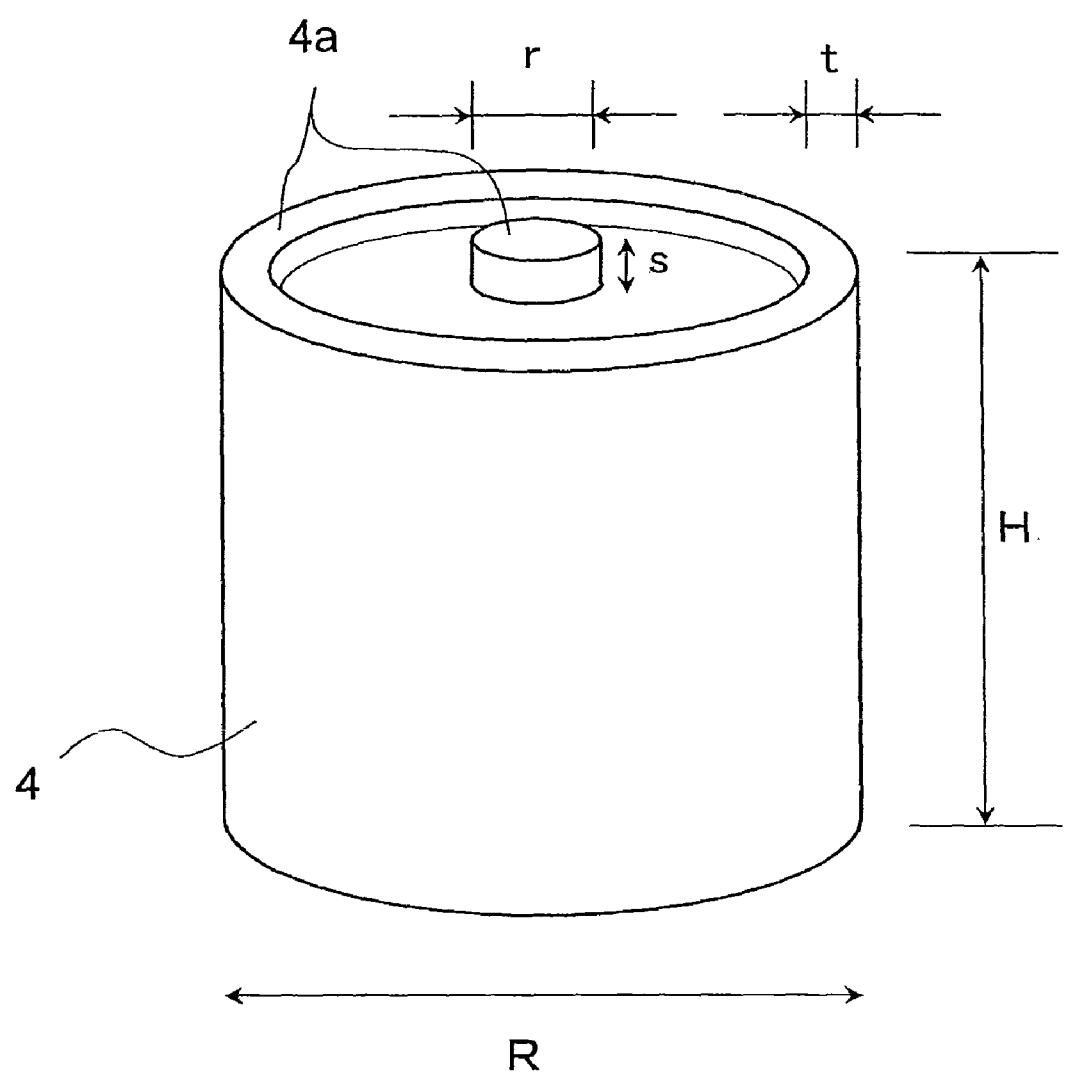
FIG. 4 is a perspective view illustrating a charging aluminum hydroxide prepared for a test.

In addition, the high-purity aluminum hydroxide shown in Table 2 as a raw material (manufactured by Nippon Light Metal Co., Ltd.: product No. BHP39) was prepared. A predetermined number of charging aluminum hydroxide 4 were prepared as follows: as shown in FIG. 4, the prepared high-purity aluminum hydroxide is press-molded into cylinder shape (65 mmΦ×80 mmH) (in FIG. 4, R=65 mm, H=80 mm) so that a concave has a depth of 5 mm on a face corresponding to the bottom part of the inner wall of the burning vessel body, and legs 4a including a spherical part and a central part (in FIG. 4, r=10 mm, t=10 mm, s=5 mm) are formed. Then, the charging aluminum hydroxides 4 were put into burning vessels A to G above. In this case, the charging aluminum hydroxide 4 was put into each of the burning vessels A to G so that only the legs 4a were in contact with the burning vessels. That is, the area where the charging aluminum hydroxide 4 was in contact with each burning vessel is a total of the surface areas of the cylindrical legs 4a, which corresponds to 8% of the surface area of the charging aluminum hydroxide 4. In addition, in a part where the charging aluminum hydroxide 4 and each of the burning vessels A to G were not in contact with each other, charging was carried out so that a space having a distance of 5 mm or more was provided between the charging aluminum hydroxide 4 and the burning vessel (burning vessel body and lid).

As described above, the burning vessels A to G contained charging aluminum hydroxide were put in electric furnaces and each vessel was burned at a burning temperature shown in Table 2 in an atmosphere of the air for 10 hours (retaining time). In this case, the average diameter of the aluminum hydroxide used in each test number and the amount of each metal as impurity are as shown in Table 2. Here, the average particle diameter of the aluminum hydroxide was measured by using a laser scattering method, Microtrac 9320HRA (X100) manufactured by NIKKISO CO., LTD. In addition, the amount of the metal as impurity contained in the aluminum hydroxide as a raw material was a value determined by an atomic absorption method and an ICP emission spectroscopic analysis method. The Na content was defined as follows: 1%10,000 ppm. Hereinafter, the amounts of the metals as impurity contained in the α-alumina after the burning treatment and wash treatment were measured similarly. Note that the amounts of the impurities contained in the aluminum hydroxide as a raw material are values in terms of alumina.

TABLE 2

Test results with different burning vessels

| | | Burning conditions | | Aluminum hydroxide (as alumina)*2 | | | | Burned alumina | | | | Alumina after wash treatment | | | |
|---|---|---|---|---|---|---|---|---|---|---|---|---|---|---|---|
| Test No. | Mark of vessel | Burning temperature*1 °C. | Average particle diameter mm | Na ppm*3 | Ca ppm | Si ppm | Fe ppm | Na ppm | Ca ppm | Si ppm | Fe ppm | Na ppm | Ca ppm | Si ppm | Fe ppm |
| 1 | C | 1,100 | 26 | 600 | 0.5 | 5 | 3 | 600 | 0.5 | 5 | 3 | 33 | 0.5 | 5 | 4 |
| 2 | | 1,100 | 52 | 920 | 0.8 | 5 | 5 | 760 | 0.9 | 6 | 5 | 24 | 1.0 | 6 | 5 |
| 3 | | 1,400 | 26 | 600 | 0.5 | 5 | 3 | 130 | 0.5 | 4 | 2 | 6 | 0.6 | 5 | 2 |
| 4 | | 1,500 | 26 | 600 | 0.5 | 5 | 3 | 70 | 0.5 | 6 | 4 | 3 | 0.5 | 7 | 4 |
| 5 | D | 1,100 | 26 | 600 | 0.5 | 5 | 3 | 620 | 0.5 | 5 | 3 | 36 | 0.5 | 5 | 3 |
| 6 | | 1,400 | 22 | 610 | 0.3 | 6 | 3 | 80 | 0.4 | 15 | 5 | 9 | 0.4 | 15 | 5 |
| 7 | | 1,400 | 26 | 600 | 0.5 | 5 | 3 | 60 | 0.5 | 7 | 4 | 9 | 0.5 | 8 | 4 |
| 8 | | 1,500 | | | | | | 70 | 0.5 | 6 | 4 | 3 | 0.5 | 6 | 3 |
| 9 | A | 1,100 | 26 | 600 | 0.5 | 5 | 3 | 590 | 0.5 | 5 | 3 | 61 | 0.5 | 6 | 3 |
| 10 | | 1,500 | | | | | | 20 | 0.8 | 24 | 16 | 2 | 0.9 | 25 | 18 |
| 11 | B | 1,100 | 26 | 600 | 0.5 | 5 | 3 | 560 | 0.5 | 5 | 3 | 52 | 0.5 | 4 | 3 |
| 12 | | 1,500 | | | | | | 10 | 0.6 | 6 | 33 | 1 | 0.7 | 7 | 33 |
| 13 | E | 1,100 | 26 | 600 | 0.5 | 5 | 3 | NA | 5 | 4 | 4 | 19 | 5 | 4 | 4 |
| 14 | | 1,300 | | 600 | 0.5 | 5 | 3 | NA | 8 | 6 | 5 | 20 | 8 | 6 | 5 |
| 15 | | 1,500 | | 600 | 0.5 | 5 | 3 | NA | 9 | 22 | 8 | 9 | 9 | 22 | 8 |
| 16 | F | 1,400 | 26 | 600 | 0.5 | 5 | 3 | NA | NA | NA | NA | 6 | 6 | 6 | 5 |
| 17 | G | 1,100 | 26 | 600 | 0.5 | 5 | 3 | 580 | 4 | 4 | 3 | 20 | 3 | 4 | 3 |
| 18 | | 1,100 | 52 | 920 | 0.8 | 5 | 5 | 630 | 3 | 6 | 5 | 78 | 3 | 7 | 5 |
| 19 | | 1,300 | 26 | 600 | 0.5 | 5 | 3 | 340 | 5 | 4 | 3 | 20 | 3 | 4 | 3 |
| 20 | | 1,400 | 24 | 760 | 0.3 | 6 | 3 | 290 | 7 | 8 | 4 | 17 | 5 | 8 | 3 |
| 21 | | 1,500 | 26 | 600 | 0.5 | 5 | 3 | 130 | 7 | 6 | 3 | 11 | 3 | 6 | 3 |

*1 The retaining time at the time of burning is 10 hours in all cases.
*2 Each amount of the impurity in aluminum hydroxide is value in terms of alumina. In addition, the terms "NA" and "ND" in Table 2 represent "not analyzed" and "not detected", respectively.
*3 10,000 ppm ≈ 1%

After the burning, the obtained α-alumina was left to stand at room temperature and each amount of the metal as impurity contained in the α-alumina was measured. Table 2 shows the results. Next, the α-alumina was slurried with 2 L of pure water (repulp water) with respect to 1 kg of the α-alumina, followed by stir washing for 1 hour. After the stir washing, the slurry was injected in a filter and the repulp water was sucked and filtered, whereby the eluted metals as impurity were removed. Further, pure water (washing water) was allowed to pass through the filtered α-alumina, and thus, the flow washing was carried out until 5 L of washing water were allowed to pass with respect to 1 kg of the α-alumina. After the wash treatment, the resultant was dried, whereby an α-alumina in which metals as impurity were removed was obtained. The measurement results of the metals as impurity contained in the obtained α-alumina were shown in Table 2. Note that the value for α-alumina whose impure amount was not measured is described as NA in Table 2. In addition, the value which cannot be detected is described as ND.

As a result of the tests with different burning vessels, it was revealed that some of α-aluminas (Test Nos. 9 to 12) obtained by burning with the burning vessels A and B and wash treatment had the Si content exceeding 20 ppm, and values of the Na content and the Fe content thereof were higher than those of the α-alumina obtained by using other burning vessels. In addition, each of the α-aluminas (Test Nos. 13 to 21) obtained by using burning vessels E, F, and G contained Ca content exceeding 2 ppm. On the contrary, the α-aluminas obtained by burning with burning vessels C and D and wash treatment (Test Nos. 1 to 8) had, in particular, smaller Ca content (2 ppm or less) compared to the case of the other burning vessels, and simultaneously, the contents of the Na content, Si content, and Fe content each were low value (Na content: 40 ppm or less, Si content: 20 ppm or less, and Fe content: 10 ppm or less).

[Burning Tests with Different Aluminum Hydroxides (Test Nos. 22 to 34)]

In order to investigate the relationship between aluminum hydroxide as a raw material (whose particle diameter and the amount of metal as impurity were changed) and burning temperature by using the vessel C which showed favorable results of those burning vessels in the above tests with different burning vessels, burning tests with different aluminum hydroxides were carried out. The prepared three kinds of aluminum hydroxides were a high-purity aluminum hydroxide powder (product name: BHP39, manufactured by Nippon Light Metal Co., Ltd.), a trial aluminum hydroxide powder (manufactured by Nippon Light Metal Co., Ltd. see Table 3), and a normal particle aluminum hydroxide (product name: B53, Nippon Light Metal Co., Ltd.). In addition, in the case of charging those aluminum hydroxides into the burning vessel C, those aluminum hydroxides were press-molded into the cylindrical charging aluminum hydroxide 4 provided with a leg 4a illustrated in FIG. 4 in the same way as in the tests with different burning vessels. After that, the burning was carried out at each burning temperature shown in Table 3 for 10 hours (retaining time) by using an electric furnace. In addition, each of the obtained α-alumina was subjected to wash treatment in the same way as in the tests with different burning vessels, and the resultant was dried, whereby an α-alumina in which metals as impurity were removed was obtained. Table 3 shows the measurement results of metals as impurity contained in each of the obtained α-alumina.

TABLE 3

Results of burning tests with different aluminum hydroxides as raw materials

| | Burning conditions | | | Aluminum hydroxide (as alumina)*2 | | | | | Burned alumina | | | | Alumina after wash treatment | | | |
|---|---|---|---|---|---|---|---|---|---|---|---|---|---|---|---|---|
| Test No. | Mark of burning vessel | Burning temperature*1 °C. | Product number | Average particle diameter μm | Na ppm | Ca ppm | Si ppm | Fe ppm | Na ppm | Ca ppm | Si ppm | Fe ppm | Na ppm | Ca ppm | Si ppm | Fe ppm |
| 22 | C | 1,100 | BHP39 | 26 | 600 | 0.5 | 3 | 3 | 600 | 0.5 | 5 | 3 | 33 | 0.5 | 5 | 4 |
| 23 | | 1,500 | | | | | | | 70 | 0.5 | 6 | 4 | 3 | 0.5 | 7 | 4 |
| 24 | | 1,100 | | 52 | 920 | 0.8 | 5 | 5 | 760 | 0.9 | 6 | 5 | 24 | 1.0 | 6 | 5 |
| 25 | | 1,500 | | | | | | | 80 | 1.1 | 8 | 6 | 3 | 0.5 | 7 | 4 |
| 26 | C | 1,100 | BHP39 | 78 | 770 | 0.3 | 5 | 3 | 850 | 0.3 | 6 | 3 | 57 | 0.4 | 6 | 3 |
| 27 | | 1,100 | | 57 | 770 | 0.5 | 5 | 3 | 510 | 0.5 | 7 | 5 | 53 | 0.5 | 7 | 4 |
| 28 | | 1,000 | | 52 | 920 | 0.8 | 5 | 5 | 770 | 1.0 | 7 | 5 | 230 | 1.1 | 8 | 4 |
| 29 | | 1,600 | | | | | | | 40 | 1.1 | 41 | 8 | 8 | 0.9 | 39 | 10 |
| 30 | | 1,000 | | 26 | 600 | 0.5 | 3 | 3 | 590 | 0.5 | 5 | 3 | 180 | 0.6 | 5 | 3 |
| 31 | | 1,100 | Trial aluminum hydroxide powder | 46 | 460 | 50 | 7 | 75 | 500 | NA | NA | NA | 27 | 48 | 3 | 70 |
| 32 | | 1,500 | | | | | | | 40 | NA | NA | NA | 3 | 33 | 6 | 72 |
| 33 | | 1,100 | B53 | 51 | 2,300 | 75 | 29 | 43 | 2,130 | NA | NA | NA | 990 | 84 | 32 | 39 |
| 34 | | 1,500 | | | | | | | 350 | NA | NA | NA | 190 | 73 | 35 | 42 |

*1The retaining time at the time of burning is 10 hours in all cases.
*2Each amount of the impurity in aluminum hydroxide is value in terms of alumina. In addition, the terms "NA" and "ND" in Table 3 represent "not analyzed" and "not detected", respectively.

As a result of burning tests with different aluminum hydroxides, in the case of using aluminum hydroxides having a particle diameter exceeding 55 μm (Test Nos. 26 and 27), some of the α-aluminas obtained by wash treatment had the Na content exceeding 40 ppm. In addition, in the case where aluminum hydroxides in which at least one of the Na content, the Fe content, the Ca content, and the Si content contained in the aluminum hydroxide as a raw material did not satisfy the following condition: "0.11 mass % or less of Na content", "6 ppm or less of Fe content", "1.5 ppm or less of Ca content", and "10 ppm or less of Si content" all in terms of alumina (Test Nos. 31 to 34), the amounts of the metals as impurity contained in the α-alumina obtained by wash treatment exceeded any one of the following standards: "40 ppm or less of Na content", "2 ppm or less of Ca content", "20 ppm or less of Si content", and "10 ppm or less of Fe content". Note that in the case where the burning temperature was 1,000° C. (Test Nos. 28 and 30), the Na content of the α-alumina obtained by wash treatment exceeded 40 ppm. In the case where the burning temperature was 1,600° C. (Test No. 29), the Si content of the α-alumina obtained by wash treatment exceeded 20 ppm.

On the contrary, in Test Nos. 22 to 25, all of the Na content, Ca content, Si content, and Fe content of the α-alumina obtained after the wash treatment satisfied the above-mentioned standards, and hence, the amounts of impurities were low. Note that NA and ND in Table 3 have the same meanings as in Table 2.

[Burning Tests by Different Charging Methods (Test Nos. 35 to 43)]

In order to confirm the difference in the amount of the impurities contained in the obtained α-alumina according to the method of charging aluminum hydroxide into a burning vessel, the following burning tests by different charging methods were carried out by using the burning vessels C and D. First, a high-purity aluminum hydroxide (BH39 manufactured by Nippon Light Metal Co., Ltd.: average particle diameter of 26 μm, Na content of 0.039 mass %, Ca content of 0.3 ppm, Si content of 3 ppm, and Fe content of 2 ppm) was press-molded into a wooden clog form. So that, as illustrated in FIG. 2, a charging aluminum hydroxide 4 equipped with a leg 4a was prepared and put into the burning vessels C and D. The charging aluminum hydroxide 4 has such a dimension that the length is 250 mm, the depth is 200 mm, and the height is 80 mm. The face corresponding to the bottom part of the inner wall of the burning vessel has five legs 4a each having a length of 15 mm and a height of 5 mm. In the case of putting the charging aluminum hydroxide 4 into the burning vessels C and D, only the legs 4a were brought into contact with the burning vessel, and in other parts, at least the space d having the distance of 5 mm or more is formed between the burning vessel body and the lid. The contact surface area between the charging aluminum hydroxide 4 and the burning vessel is 10% of the surface area of the charging aluminum hydroxide 4. Then, as shown in Table 4, the burning was carried out in the same way as in the burning tests with different burning vessels except that the burning temperature was set to 1,450° C. and the retaining time was set to 10 to 12 hours. After that, the α-alumina after the burning was subjected to wash treatment in the same way as in the above burning tests with different burning vessels, and the amounts of metals as impurity were measured in the same way as in the above burning tests with different burning vessels (Test Nos. 35 and 36).

In addition, as a comparative example, aluminum hydroxide as a raw material was charge into a burning vessel body by a general method, i.e. aluminum hydroxide was filled as it was without press-forming so as to be in contact with the bottom part of the inner wall and the side part of the inner wall of the burning vessel body. Then, burning and wash treatment were carried out in the same manner as the above, and the amounts of the metals as impurity were measured (Test Nos. 37 and 38). The results of Test Nos. 35 to 38 were as shown in Table 4. In the case of charging aluminum hydroxide without a leg (Test Nos. 37 and 38), the Si content exceeding 20 ppm was contained in the α-alumina.

TABLE 4

Amounts of impurities in α-alumina by different charging methods

| Test No. | | Burning conditions | | | | Alumina after wash treatment | | | |
|---|---|---|---|---|---|---|---|---|---|
| | | Burning | | | | | | | |
| | Burning vessel | temperature*1 ° C. | charging method | Collect site*2 | | Na ppm | Ca ppm | Si ppm | Fe ppm |
| 35 | C | 1,450 | Molding into wooden clog form | Assembly of I to IV | | 7 | 0.8 | 16 | 6 |
| 36 | D | 1,450 | Molding into wooden clog form | Assembly of I to IV | | 9 | 0.7 | 18 | 5 |
| 37 | C | 1,450 | Normal filling | Assembly of I to IV | | 8 | 0.8 | 24 | 7 |
| 38 | D | 1,450 | Normal filling | Assembly of I to IV | | 8 | 0.8 | 32 | 7 |
| Reference 35 | C | 1,450 | Molding into wooden clog form | I | | 7 | 0.9 | 84 | 16 |
| | | | Molding into wooden clog form | II | | 8 | 0.6 | 45 | 15 |
| | | | Molding into wooden clog form | III | | 8 | 0.8 | 14 | 5 |
| | | | Molding into wooden clog form | IV | | 7 | 1.3 | 14 | 10 |
| Reference 38 | D | 1,450 | Normal filling | I | | 7 | 1.6 | 128 | 15 |
| | | | Normal filling | III | | 8 | 0.7 | 17 | 5 |
| | | | Normal filling | IV | | 7 | 0.7 | 12 | 7 |

Figure 5:
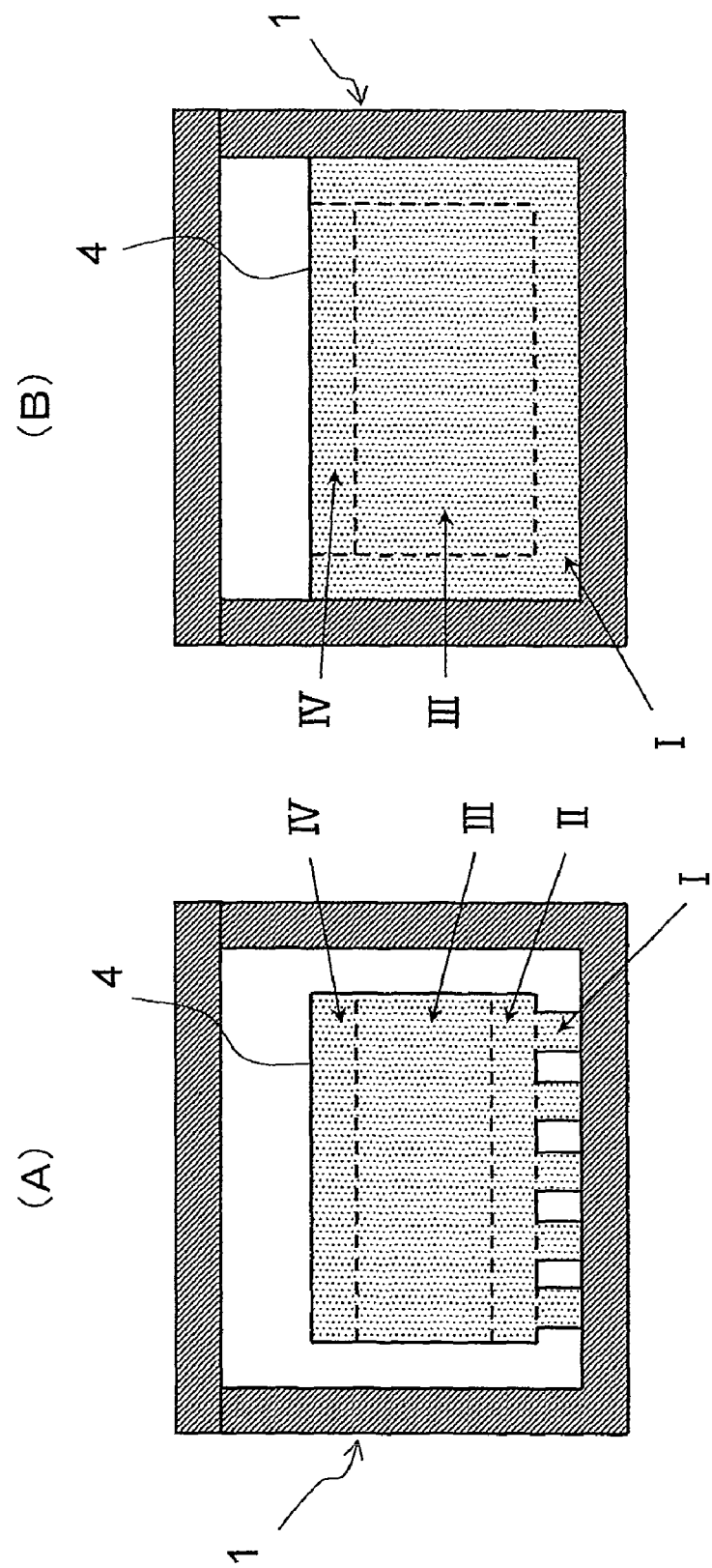
FIGS. 5(A) and 5(B) are sectional views illustrating a method of charging aluminum hydroxide into a burning vessel (used in a part of the section [Burning test by different charging methods])

*1The retaining time at the time of burning is 10 to 12 hours.
*2See FIG. 5 as to sites I to IV (each site has a thickness of 5 mmH).

In addition, in the burning tests by different charging methods, as a reference, in order to confirm the amounts of impurities at different sites of the charging aluminum hydroxide 4 after the burning, a predetermined site in the case where aluminum hydroxide was press-molded into a wooden clog form (Test No. 35) and a predetermined site in the case where aluminum hydroxide was filled without press-molding (Test No. 38) were collected separately. Then, those sites were subjected to wash treatment separately and the amounts of impurities were compared. First, in the charging aluminum hydroxide 4 press-molded into a wooden clog form, as shown in FIG. 5(A), the amounts of impurities contained in the leg 4a of the charging aluminum hydroxide 4 after the burning (site I), a surface layer part having a thickness of 5 mm and excluding the leg 4a at the bottom part of the inner wall of the burning vessel body (site II), the surface layer part having a thickness of 5 mm at the lid side (site IV), and the remaining part except for those parts (site III) were each examined. In addition, in the case of the charging aluminum hydroxide 4 which was filled as it was, the amounts of impurities contained in the surface layer part having a thickness of 5 mm which is in contact with the burning vessel body (site I), the surface layer part having a thickness of 5 mm and excluding the site I at the lid side (site IV), and the remaining part except for those parts (site III) were each examined. That is, in any cases, the site I is a part in contact with the burning vessel and sites II to IV are noncontact parts. Table 4 shows the results. As is clear from the results, it was confirmed that the α-alumina at the part in contact with the burning vessel was contaminated with a large amount of the Si content. Therefore, regarding the part in contact with the burning vessel of the α-alumina after the burning, if at least a part having a distance of 5 mm (depth of 5 mm) from the surface layer is removed, the Si content of the 1-alumina to be obtained finally can be reduced.

Further, in order to confirm the influence of the space formed between the charging aluminum hydroxide and the burning vessel, the distance of the space between the charging aluminum hydroxide and the burning vessel was adjusted to 1 to 10 mm, followed by burning. Then, the amounts of the metals as impurity contained in the α-alumina were measured. Specifically, for the case where the space d (space d illustrated in FIG. 1) between the charging aluminum hydroxide 4 press-molded into a wooden clog form and the burning vessel 1 (burning vessel C) was set to 5 mm or more (Test Nos. 39 to 41) and for the case where the space was less than 5 mm (Test Nos. 42 and 43), the burning was carried out in the same way as in the tests with different burning vessels except that the burning temperature was 1,350 to 1,400° C. and the retaining time was 10 to 12 hours. Then, the amounts of metals as impurity contained in the α-alumina after the burning were measured. Note that the site where the amounts of metals as impurity were measured is site II illustrated in FIG. 5(A).

As is clear from the results shown in Table 5, in the case where the space d was less than 5 mm (Test Nos. 42 and 43), it was confirmed that the Si content exceeding 20 ppm was contained in the α-alumina after the burning. Therefore, if aluminum hydroxide was charged and burned so that at least a space having a distance of 5 mm was provided, the Si content of the α-alumina to be finally obtained can be reduced.

TABLE 5

Amounts of impurities of α-alumina after burning with different distances d

| | Burning conditions | | | | | Burned alumina | | | |
|---|---|---|---|---|---|---|---|---|---|
| | | Burning | | Space | | | | | |
| Test No. | Burning vessel | temperature[*1] °C. | charging method | distance mm | Collecting site[*2] | Na ppm | Ca ppm | Si ppm | Fe ppm |
| 39 | C | 1,400 | molding | 10 | II | 50 | 1.0 | 9 | 6 |
| 40 | | 1,400 | into wooden | 5 | | 130 | 0.5 | 10 | 3 |
| 41 | | 1,400 | clog form | 5 | | 150 | 0.4 | 15 | 5 |
| 42 | | 1,350 | | 2 | | 140 | 0.7 | 32 | 3 |
| 43 | | 1,400 | | 1 | | 100 | 1.0 | 55 | 12 |

[*1]The retaining time at the time of burning is 10 to 12 hours.
[*2]See FIG. 5 as to sites I to IV (each site has a thickness of 5 mmH).

[Removal Effect Test of Na Content (Test Nos. 44 to 55)]

In order to confirm the effect of Na content removal by wash treatment, the change amount of the Na content contained in α-alumina before and after the wash treatment were measured by changing conditions of the stir washing and the flow washing. As shown in Table 6, in Test Nos. 44 to 48, a high-purity aluminum hydroxide having an average particle diameter of 38 μm and an Na content of 0.092 mass % (in terms of alumina) was used, and a charging aluminum hydroxide was burned at the burning temperature of 1,200° C. for retaining time of 10 hours by using the burning vessel C in the same way as in the section [Burning tests by different charging methods]. In Test Nos. 49 to 55, a high-purity aluminum hydroxide having an average particle diameter of 27 μm and an Na content of 0.077 mass % (in terms of alumina) was used, and a charging aluminum hydroxide was burned at the burning temperature of 1,400° C. for retaining time of 10 hours by using the burning vessel C in the same way as in the section [Burning tests by different charging methods].

Next, the 1-alumina obtained above was subjected to stir washing and flow washing in the same way as in the section [Tests with different burning vessels] under the washing conditions shown in Table 6. After the wash treatment, the resultant was dried, whereby an α-alumina in which metals as impurity were removed was obtained. In this treatment, Table 6 shows the results of Na removal ratio, which is derived from the Na content contained in the α-alumina before the wash treatment and the Na content contained in the α-alumina after the wash treatment. Here, the Na removal ratio is a value derived from "Na removal ratio (%)=100×(Na content contained in α-alumina before wash treatment−Na content contained in α-alumina after wash treatment)/(Na content contained in α-alumina before wash treatment)" (if the ratio is 100%, it corresponds to complete removal).

As is clear from Table 6, in the case where an α-alumina was slurried with 2 L or more of repulp water with respect to 1 kg of α-alumina and subjected to stir washing for 1 hour or longer and the α-alumina after the stir washing was subjected to flow washing by passing 3 L or more of washing water with respect to 1 kg of the α-alumina, there was exhibited such an excellent removal effect that the Na removal ratio was 90% or more in any cases.

TABLE 6

Na removal effect with different washing conditions

| | Alumina burning conditions | | Washing conditions (with respect to alumina) | | | |
|---|---|---|---|---|---|---|
| Test No. | Mark of burning vessel | Burning temperature[*1] °C. | Repulp water (L/kg) | Stirring time (h) | Passed filter water (L/kg) | Na removal ratio[*2] (%) |
| 44 | C | 1,200 | 1 | 1 | 5 | 84 |
| 45 | | | 2 | 1 | 5 | 91.4 |
| 46 | | | 5 | 1 | 5 | 92.6 |
| 47 | | | 2 | 0.25 | 5 | 87.9 |
| 48 | | | 2 | 5 | 5 | 90.3 |
| 49 | C | 1,400 | 2 | 0.17 | 0 | 57.3 |
| 50 | | | 2 | 0.5 | 0 | 59.1 |
| 51 | | | 2 | 1 | 0 | 74.5 |
| 52 | | | 2 | 1 | 1 | 89.1 |
| 53 | | | 2 | 1 | 3 | 94.1 |
| 54 | | | 2 | 1 | 5 | 95.9 |
| 55 | | | 2 | 1 | 6 | 95.9 |

[*1]The retaining time at the time of burning was 10 hours in all cases.
[*2]Na removal ratio (%) = 100 × (Na content contained in α-alumina after wash treatment − Na content contained in α-alumina after wash treatment)/(Na content contained in α-alumina before wash treatment).

[Supplementary Test of Removal Effect of Na Content (Test Nos. 56 to 62)]

In order to additionally increase the removal effect of the Na content in the high-purity α-alumina obtained by the wash treatment, as shown in Table 7, the following supplementary Na removal treatments were carried out. The stir washing and the flow washing by the method as shown in Test No. 45 of the section [Removal effect test of Na content] and α-alumina to be finally obtained (hereinafter referred to as "sample of Test No. 45") was subjected to heat treatment again at 800° C. for 1 hour and the resultant was slurried with 2 L of pure water per kg of alumina again, followed by stir washing for 1 hour. Further, the resultant was subjected to flow washing with 5 L of pure water per kg of alumina (Test No. 56). In addition, in Test No. 57, the same treatments were performed as in Test No. 56 except that the sample of Test No. 45 was heated again at 1,000° C. for 1 hour. Further, in Test No. 58, a series of treatments carried out in Test No. 57 were carried out twice in total.

each of Test Nos. 56 to 59, and 62, the change in Na amount (ΔNa) was revealed to be 5 ppm or more by the supplementary Na removal effect test.

By the way, in this supplementary test for Na content removal effect, the supplementary test of Na content removal effect was carried out after the BET specific surface area of the sample of Test No. 45 was measured. Then, the BET specific surface area of the α-alumina obtained in the supplementary test of Na content removal effect was measured and

TABLE 7

Supplementary test of Na removal effect with different conditions after wash treatment

| Test No. | Alumina burning conditions | | Wash conditions (with respect to alumina) | | | Alumina after wash treatment (alumina before supplementary Na removal treatment) | | Supplementary Na removal treatment condition | Alumina after supplementary Na removal treatment | | | |
|---|---|---|---|---|---|---|---|---|---|---|---|---|
| | | | | | | | | | | Change in | | |
| | Mark of burning vessel | Burning temperature*[1] ° C. | Repulp water (L/kg) | Stirring time (h) | Passed filter water (L/kg) | Na content ppm | BET m²/g | | Na content ppm | Na content*[2] Δppm | BET m²/g | BET Change*[3] Δm²/g |
| 56 | C | 1,200 | 2 | 1 | 5 | 23 | 4.2 | 800° C. × 1 h reheating + wash treatment | 16 | 7 | 4.2 | 0.0 |
| 57 | | | | | | | | 1,000° C. × 1 h reheating + wash treatment | 13 | 10 | 4.2 | 0.0 |
| 58 | | | | | | | | (1,000° C. × 1 h reheating + wash treatment) × twice | 8 | 15 | 4.2 | 0.0 |
| 59 | C | 1,200 | 2 | 1 | 5 | 27 | 4.1 | After pulverizing, slurried with pure water Cation exchange resin 50 ml/kg, slurry contact for 24 hours | 16 | 11 | 4 | 0.1 |
| 60 | C | 1,200 | 2 | 1 | 5 | 23 | 4.2 | 500° C. × 1 h reheating + wash treatment | 22 | 1 | 4.2 | 0.0 |
| 61 | | | | | | | | 700° C. × 1 h reheating + wash treatment | 21 | 2 | 4.2 | 0.0 |
| 62 | | | | | | | | 1,200° C. × 1 h reheating + wash treatment | 4 | 19 | 3.5 | 0.7 |

*[1]The retaining time at the time of burning was 10 hours in all cases.
*[2]ΔNa = Na content in alumina subjected to wash treatment − Na content in alumina subjected to supplementary Na removal treatment
*[3]ΔBET = BET of alumina subjected to wash treatment − BET of alumina subjected to supplementary Na removal treatment On the other hand, in Test No. 59, the sample of Test No. 45 was pulverized to have an average particle diameter of 5 μm or less and the resultant was slurried and brought into contact with an cation exchange resin (DIAION SK1B manufactured by Mitsubishi Chemical Corporation) to thereby remove the Na content. In this case, after the slurry of the α-alumina was brought into contact with the cation exchange resin for 24 hours at a ratio of 50 ml of the cation exchange resin with respect to 1 kg of the α-alumina, they were separated and collected. Note that the sample of Test No. 45-used in this test was obtained by the same test method as in Test No. 45 and is not the α-alumina itself obtained in Test No. 45 of the section [Removal effect test of Na content]. Therefore, there were two kinds of α-aluminas having different Na contents used in this test.

Further, in Test No. 60, the same treatments were carried out as in Test No. 56 except that the sample of Test No. 45 was reheated at 500° C. for 1 hour. In Test No. 61, the same treatments were carried out as in Test No. 56 except that the sample of Test No. 45 was reheated at 700° C. for 1 hour. In Test No. 62, the same treatments were carried out as in Test No. 56 except that the sample of Test No. 45 was reheated at 1,200° C. for 1 hour.

As is clear from Table 7, a sufficient Na removal effect was confirmed in each of Test Nos. 56 to 59, and 62. That is, in the values before and after the supplementary Na content removal treatment were compared. The BET specific surface area is inversely proportional to the primary particle diameter of the α-alumina and can be used as a judgement index for change in the primary particle diameter of the α-alumina, e.g. "BET specific surface area decreased≈primary particle diameter of α-alumina grew largely" or "no change in BET specific surface area≈ no growth in primary particle diameter of α-alumina." Note that a specific surface area automatic measurement device (type: Flowsorb II 2300) manufactured by Micromeritics Instrument Corporation was used for measurement of the BET specific surface area.

As shown in Table 7, in Test Nos. 56 to 61, there was little change amount of the BET specific surface area (ΔBET) before and after the supplementary test of Na content removal effect (in particular, there was no change in Test Nos. 56 to 58, 60, and 61) and it is presumed that particle growth (physical properties change) did not occur.

That is, in Test Nos. 56 to 59 of these tests, it was confirmed that the Na content can be removed efficiently without changing alumina particles.

INDUSTRIAL APPLICABILITY

The high-purity α-alumina obtained in the present invention can be widely used, in addition to general applications of the α-alumina such as ceramics material, in a refractory, an insulator, an abrasive material, a pharmaceutical, an adsorbent, a filler, a catalyst carrier, a raw material of a special glass, a raw material of a monocrystal, a phosphorescent material, plasma spraying material, and the like. In particular, the contents of an Si content, an Fe content, a Ca content, and an Na content are small in the high-purity α-alumina, and hence, the high-purity α-alumina is suitable for applications such as fine ceramics, an electronic part, raw material of a monocrystal, a phosphorescent material, and the like.

The invention claimed is:

1. A process for producing a high-purity α-alumina, comprising:
    burning aluminum hydroxide having an Na content of 0.11 mass % or less, an Fe content of 6 ppm or less, a Ca content of 1.5 ppm or less, and an Si content of 10 ppm or less as impurities in terms of alumina respectively, and having an average particle diameter of 55 μm or less at a burning temperature of 1,100 to 1,500° C. by using a burning vessel containing $Al_2O_3$ in a range of 85 to 93 wt % and $SiO_2$ in a range of 7 to 14 wt %; and
    subjecting the obtained α-alumina to wash treatment.

2. A process for producing a high-purity α-alumina according to claim 1, by which an α-alumina having an Si content of 20 ppm or less, an Fe content of 10 ppm or less, a Ca content of 2 ppm or less, and an Na content of 40 ppm or less is obtained.

3. A process for producing a high-purity α-alumina according to claim 1 or 2, wherein the aluminum hydroxide is an aluminum hydroxide obtained by a Bayer method.

4. A process for producing a high-purity α-alumina according to claim 1, wherein, at the time of the burning, a contact area between a charging aluminum hydroxide to be charged into the burning vessel and the burning vessel is 30% or less of a surface area of the charging aluminum hydroxide and a space having a distance of 5 mm or more is provided in a noncontact part where the charging aluminum hydroxide and the burning vessel are not in contact with each other.

5. A process for producing a high-purity α-alumina according to claim 1, wherein the wash treatment comprises:
    stir washing involving slurrying the α-alumina with 2 L or more of a repulp water with respect to 1 kg of the α-alumina and stirring the slurry for 1 hour or longer; and
    flow washing involving passing 3 L or more of washing water with respect to 1 kg of the α-alumina after the stir washing.

6. A process for producing a high-purity α-alumina according to claim 1, further comprising:
    subjecting the α-alumina to heat treatment at a temperature of 800 to 1,000° C. after the wash treatment; and
    subjecting the α-alumina to wash treatment again.

7. A process for producing a high-purity α-alumina according to claim 1, further comprising after the wash treatment:
    subjecting the α-alumina to pulverizing treatment;
    slurrying the resultant again; and
    removing metals as impurity by using an ion exchange resin.

* * * * *